(12) United States Patent
Vier et al.

(10) Patent No.: US 8,971,049 B1
(45) Date of Patent: Mar. 3, 2015

(54) PORTABLE ELECTRONIC DEVICE HAVING INTEGRATED PERIPHERAL EXPANSION MODULE

(75) Inventors: Bradford Edward Vier, Austin, TX (US); Christopher Lorenzo Dunn, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 182 days.

(21) Appl. No.: 13/531,168

(22) Filed: Jun. 22, 2012

(51) Int. Cl.
*H05K 5/00* (2006.01)

(52) U.S. Cl.
USPC ........... 361/752; 361/741; 361/756; 361/740; 361/731; 29/832; 29/830; 29/843; 29/876

(58) Field of Classification Search
CPC .................................................... G06F 1/1632
USPC ......... 361/752, 741, 756, 740, 731, 727, 728; 439/121, 122
See application file for complete search history.

(56) References Cited

U.S. PATENT DOCUMENTS

| | | | |
|---|---|---|---|
| 5,325,262 A | 6/1994 | Ma | |
| 5,497,339 A | 3/1996 | Bernard | |
| 5,513,074 A * | 4/1996 | Ainsbury et al. | 361/737 |
| 6,356,436 B1 | 3/2002 | Buican et al. | |
| 6,370,608 B2 | 4/2002 | Yamada et al. | |
| 6,392,634 B1 | 5/2002 | Bowers et al. | |
| 6,784,870 B2 | 8/2004 | Yin | |
| 6,788,532 B2 | 9/2004 | Yang et al. | |
| 6,842,335 B1 | 1/2005 | Hanson et al. | |
| 7,170,742 B2 | 1/2007 | Na et al. | |
| 7,200,702 B2 | 4/2007 | Keely et al. | |
| 7,948,741 B2 | 5/2011 | Fan | |
| 2003/0058614 A1 | 3/2003 | Na et al. | |
| 2003/0112584 A1 * | 6/2003 | Reker | 361/622 |
| 2004/0100446 A1 | 5/2004 | Bronson | |
| 2006/0028791 A1 * | 2/2006 | Huang et al. | 361/683 |

* cited by examiner

*Primary Examiner* — Jinhee Lee
*Assistant Examiner* — Mandeep Buttar
(74) *Attorney, Agent, or Firm* — Kevin L. Daffer; Daffer McDaniel LLP

(57) ABSTRACT

A portable electronic device, a peripheral expansion module and methods for assembling a peripheral expansion module onto a portable electronic device are provided herein. The portable electronic device may comprise a main housing unit having a front cover and a back cover which, when coupled together, enclose internal components of the portable electronic device. The peripheral expansion module, comprising one or more peripheral devices coupled within or on a peripheral module housing, may be securely integrated with the portable electronic device. A majority of the peripheral expansion module may be positioned outside of the main housing unit along one side of the portable electronic device. In some embodiments, the peripheral expansion module includes a pair of rails, which extend out from within an interior of the module housing for attachment via one or more mechanical fasteners to an interior surface of the main housing unit of the portable electronic device.

12 Claims, 13 Drawing Sheets

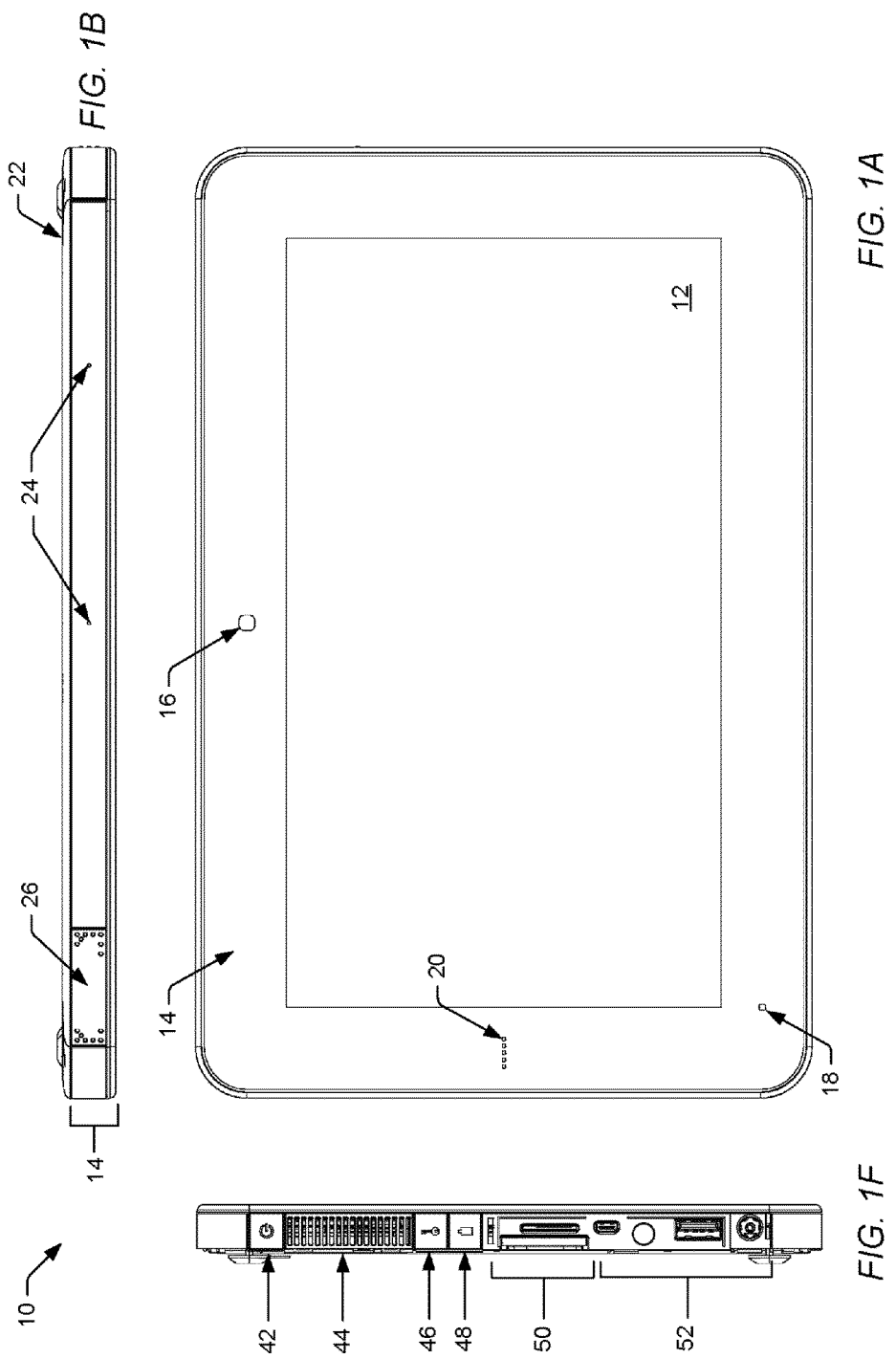

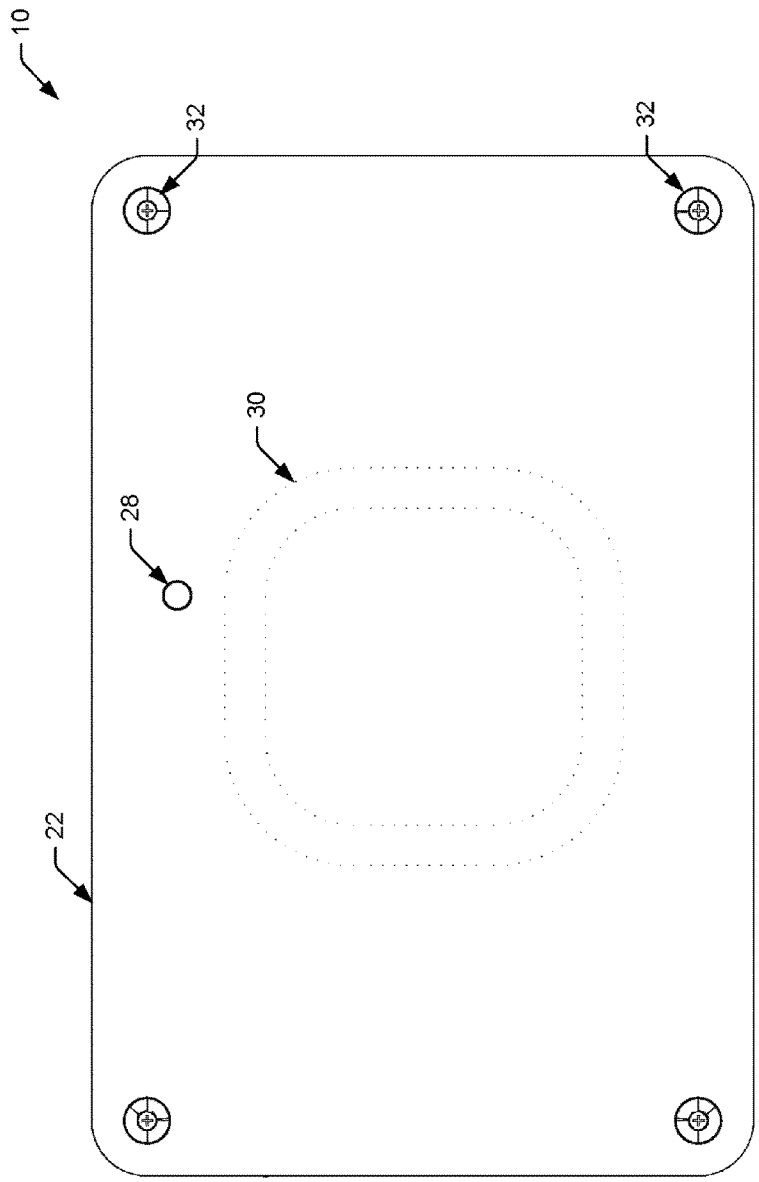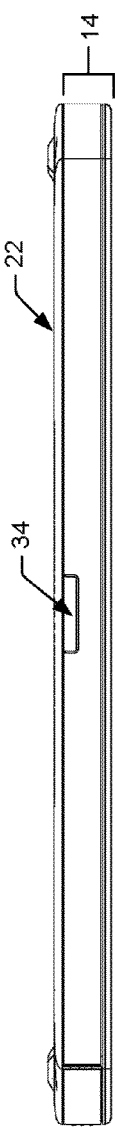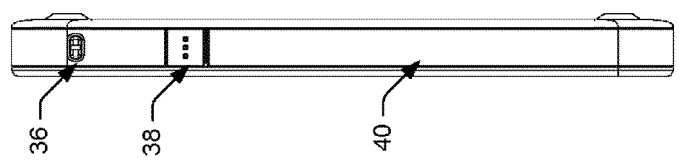

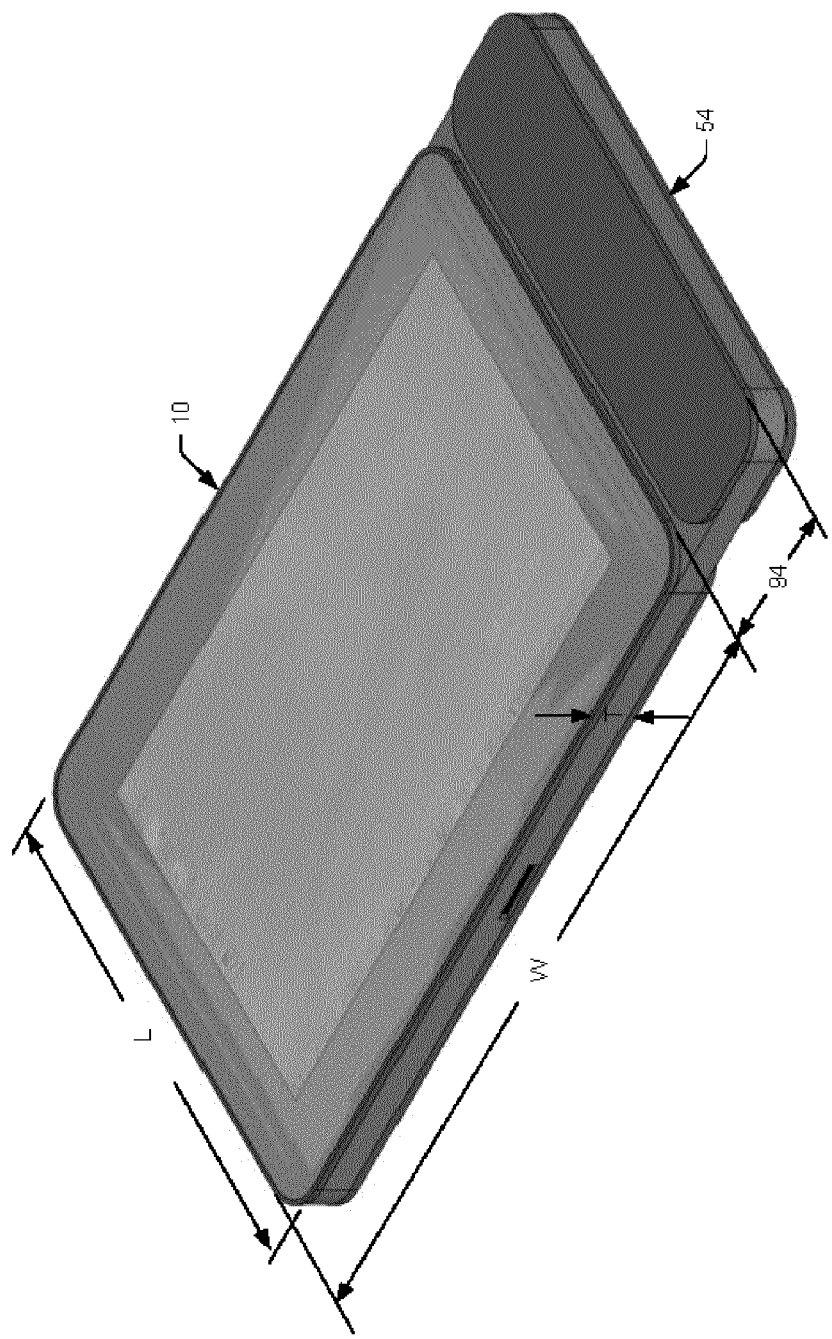

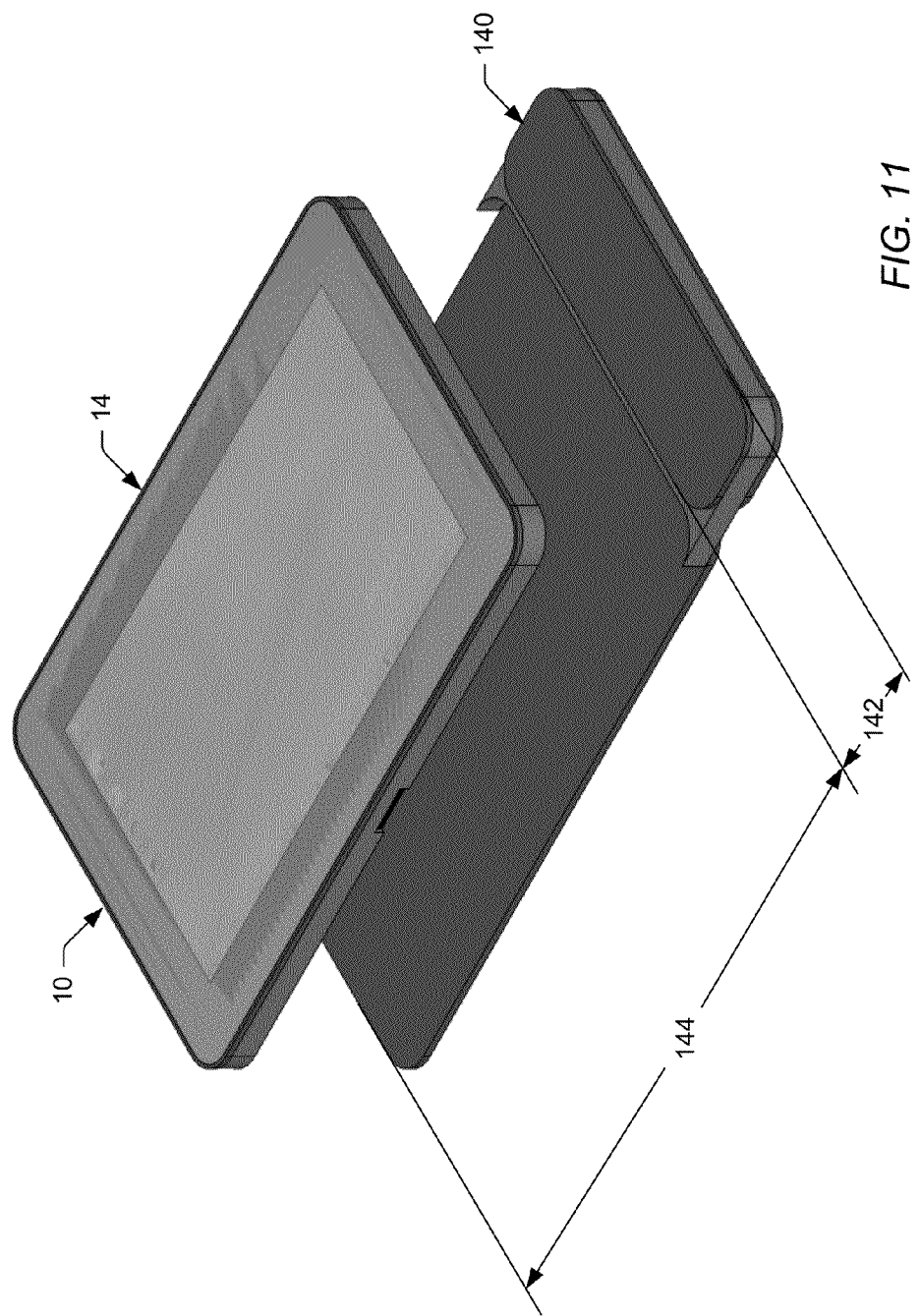

PORTABLE ELECTRONIC DEVICE HAVING INTEGRATED PERIPHERAL EXPANSION MODULE

BACKGROUND OF THE INVENTION

1. Field of the Invention

This invention relates to portable electronic devices and, more particularly, to a portable electronic device having a peripheral expansion module, comprising one or more peripheral devices, securely integrated with the portable electronic device.

2. Description of the Related Art

The following descriptions and examples are given as background only.

Portable personal computers (PCs), including tablet PCs, laptop computers, and personal digital assistants (PDAs), allow computer users to utilize many of the functions of a personal computer while facilitating freedom of movement about a workplace. By comparison to a desktop computer, portable computers are compact, lightweight, and easy to carry. One type of portable computer, the tablet PC, offers a very high level of mobility and flexibility to the user. However, portable computer designs may be limited by a tradeoff between compactness and the functionality/features they provide.

For example, portable computing devices are often used in conjunction with one or more peripheral devices, such as a keyboard, mouse, display screen, USB hub, port replicator, camera, speaker, bar code reader, magnetic stripe reader, etc. In most cases, a portable computer gains access to such peripheral devices through either a docking station, or by attaching a peripheral device directly to the portable computer host. The peripheral device may be a detached device, which is coupled to the portable computer host via a cable, or an attachable device that can be removably secured to the external housing of the portable computer host by way of latches, retention clips, guide rails and grooves, or by inserting the peripheral device or a port of the peripheral device into a connection port of the portable computer host. While such attachment means increases the functionality and feature set provided to the portable computer host, the typical means for attaching a peripheral device to a portable computer host may be undesirable in some computing environments or user applications.

If the peripheral device is a detached device, for example, it typically requires an additional hand to hold and operate, which may be difficult when a user is carrying the portable computer and peripheral device. In addition, detached peripheral devices must be transported along with the portable computer as the user moves, e.g., throughout the workplace or to some other location. Typical methods of transporting detached peripheral devices, such as carrying them separately or loading them into a carrying case along with the portable computer, are inconvenient and cumbersome.

If the peripheral device is an attachable device, the integration of the peripheral device with the portable computer host is typically done as an afterthought on the part of the manufacturer. As a result, the peripheral device may not appear to be seamlessly integrated with its computer host. In addition, the attachment means used to easily connect and disconnect an attachable peripheral device from its host (e.g., latches, retention clips, guide rails and grooves, or other means for attachment to an external surface or port of the portable computer) do not provide a highly secure means of attachment, as these devices can be easily removed by intentional (e.g., theft) or non-intentional means (e.g., an impact force caused by dropping the portable computer and attached peripheral device).

Finally, manufacturers are being driven by the needs of end users to customize portable computing devices to their specific applications. In particular, market trends have shown an increasing desirability for a peripheral expansion module, which may be customized to include one or more peripheral devices chosen to support a user's particular need. Such a peripheral expansion module could be integrated with a portable computing device at the time of manufacture, or as a subsequently added upgrade feature.

In either case, it would be desirable to securely integrate the peripheral expansion module with the portable computing device, so that the peripheral expansion module appears and behaves as a substantially seamless extension of the computer host. In particular, a need exists to provide a highly secure means of attaching a peripheral expansion module to a portable computing device to prevent theft, accidental detachment of the peripheral expansion module from the host device, or damage caused to the expansion module or the host device by mechanical forces. The present invention described herein meets these needs by providing a customizable peripheral expansion module, which can be securely integrated with a portable computing device.

SUMMARY OF THE INVENTION

The following description of various embodiments of a portable electronic device, a peripheral expansion module and a method for assembling a peripheral expansion module to a portable electronic device is not to be construed in any way as limiting the subject matter of the appended claims.

According to one embodiment, a portable electronic device is provided herein with a main housing unit having a front cover and a back cover which, when coupled together, enclose internal components of the portable electronic device and provide structural rigidity to the portable electronic device. As used herein, a "portable electronic device" may be any mobile electronic device, such as a portable computer (e.g., a laptop computer, a notebook computer, or tablet computer), a personal digital assistant (PDA), a personal media player, a netbook, an e-reader or a mobile phone (e.g., a smart phone). In one preferred embodiment, the portable electronic device is a tablet computer, although it is certainly not limited to such.

According to one embodiment, the portable electronic device is provided herein with a securely integrated peripheral expansion module comprising one or more peripheral devices coupled within or on a module housing. According to another embodiment, a peripheral expansion module is provided herein for securely attaching to a portable electronic device. According to yet another embodiment, a method is provided herein for assembling a peripheral expansion module to a portable electronic device, such that the expansion module appears and behaves as a substantially seamless extension of the portable electronic device. In all embodiments, the majority of the peripheral expansion module may be positioned outside of the main housing unit along one side of the portable electronic device, such as a top side, a bottom side, a right side or a left side of the portable electronic device. In addition, the peripheral expansion module may be configured for secure integration with the portable electronic device.

In one embodiment, the one or more peripheral devices may comprise a magnetic stripe reader and a barcode scanner. However, the type and number of peripheral devices included within the peripheral expansion module are not limited to any particular type or number of devices. In general, the peripheral expansion module described herein may comprise one or more peripheral devices including, but not limited to, magnetic stripe readers/writers, barcode scanners, smart card readers, chip & PIN card readers, cameras, RFID readers, radio modules, thermometers, electronic rangefinders, fingerprint readers, and GPS modules, and/or ports, connectors or interfaces for accessing external devices, which may be physically or functionally linked to the peripheral expansion module while residing outside of the peripheral module housing (such as, e.g., thermometers, automobile or equipment diagnostic and control electronics, etc.)

According to one embodiment, the peripheral expansion module may comprise a module housing, which includes one or more peripheral devices, a front cover and a back cover coupled to the front cover. In addition, the peripheral expansion module may include a pair of rails, which extend out from within an interior of the module housing for attachment via one or more mechanical fasteners to an interior surface of the main housing unit of the portable electronic device. As described in more detail below, the pair of rails and mechanical fasteners may provide a highly secure means of attaching the peripheral expansion module to the portable electronic device, so as to prevent theft, accidental detachment of the peripheral expansion module from the host device, or damage caused to the expansion module or to the host device by mechanical forces.

The interior surface of the main housing unit, to which the pair of rails are attached, may be an interior surface of the front cover, an interior surface of the back cover, or an internal frame structure coupled within the main housing unit of the portable electronic device. The mechanical fasteners used to attach the rails to the interior surface of the main housing unit may be, for example, screws, latches, snaps, clips, interlocking tabs, or any other means for securely attaching the rails to the interior surface of the main housing unit. In some cases, interference fit bosses, solder joints, and/or adhesives may be used if the attachment of the rails to the interior surface of the main housing unit is desired to be irreversible. By securely attaching the rails to the interior surface of the main housing unit, the attachment means described herein may prevent theft and/or accidental detachment of the peripheral expansion module from the portable electronic device.

In addition to providing a secure attachment between the portable electronic device and the peripheral expansion module, the rails may be specifically configured for transferring a load from the peripheral expansion module to the portable electronic device. For example, if a user holds the portable electronic device by the peripheral expansion module, a significant force may be applied to an interface between the portable electronic device and the module. On the other hand, the peripheral expansion module may be subject to impact forces if the portable electronic device were dropped or otherwise hit against a hard surface. These forces or loads must be distributed to the structure of the portable electronic device to prevent damage within the peripheral expansion module, damage within the portable electronic device, or damage at the interface between the peripheral expansion module and portable electronic device. As described below, loads may be distributed to the structure of the portable electronic device in a number of different ways.

First, loads may be transferred from the peripheral module housing to the pair of rails contained therein by securely attaching the rails to an inside surface of the peripheral module housing. In some cases, the pair of rails may be integrally formed with an inside surface of the peripheral module housing, such as an inside surface of the front cover or an inside surface of the back cover of the peripheral module housing. In other cases, the rails may be tightly attached to the inside surface of the peripheral module housing one or more of the mechanical fasteners mentioned above. In some cases, the rails may be sandwiched between the front and back covers of the peripheral module housing, so that each cover comes in contact with the rails to effectively transfer loads directly to the rails.

In order to transfer loads from the rails to the portable electronic device, the rails are configured to be strong and stiff without adding significant weight or consuming too much internal space within the peripheral module housing or the portable electronic device. In addition, it is desirable to distribute the loads across the structure of the portable electronic device to decrease the amount of load applied to any particular part of the device.

In order to minimize weight, the rails may be formed from a thin sheet or strip of metal or metal alloy, in some embodiments of the invention. In one example, the rails may be formed from a 0.5 mm thick piece of half-hard stainless steel, or some other metal or metal alloy, although the material or manufacturing process choice for the rails is not limited to such. To strengthen the rails, resist torsional forces and conserve internal space within the peripheral expansion module and the portable electronic device, the rails may be oriented parallel to one another and positioned along opposite inside surfaces of the peripheral module housing. In one example, a first rail of the pair of rails may be arranged within the peripheral module housing adjacent to a top side of the module housing, while a second rail of the pair of rails is arranged within the module housing adjacent to a bottom side of the module housing. Positioning the rails adjacent to the top and bottom inside surfaces of the peripheral module housing effectively increases the strength of the rails by allowing the rails to come in contact with the inside surfaces.

To further strengthen the rails, each rail may be formed in an "L" shape to resist bending in the horizontal and vertical directions. In particular, each rail may be formed having a vertical portion and a horizontal portion extending orthogonally from the vertical portion in an L-shape. The vertical portions of the rails may be arranged adjacent to the top and bottom sides of the module housing to resist bending in the horizontal direction, while the horizontal portions of the rails are configured to resist bending in the vertical direction. In some embodiments, a portion of each rail near an interface between the peripheral module housing and the main housing unit of the portable electronic device may be reinforced (e.g., with increased width and/or an additional support plate) to resist bending at the interface.

To distribute loads across the structure of the portable electronic device, a length of each rail may be configured so that, when the peripheral expansion module is integrated with the portable electronic device, the pair of rails extend into the main housing unit of the portable electronic device by more than 30% of a width of the main housing unit. In some cases, the pair of rails may extend into the main housing unit by more than 40% of the main housing width, more than 50% of the main housing width, or even further, so as to distribute the loads over a large portion of the structure of the portable electronic device. In addition, each rail may be attached to the interior surface of the main housing unit via a plurality of mechanical fasteners at a plurality of attachment locations, which may be distributed along the length of each rail. By using a plurality of attachment locations, the loads can be distributed across multiple attachment locations, so that no single location receives all of the load.

In some embodiments, the portable electronic device may include an internal frame structure, which is arranged within the main housing unit for supporting and/or shielding one or more internal components of the portable electronic device. In such embodiments, the pair of rails may be additionally or alternatively attached via the mechanical fasteners to the internal frame structure of the portable electronic device, so that at least some of the load is distributed across the internal frame structure. In some cases, depressions may be formed within the internal frame structure for receiving the rails and to further assist in distributing the load across the internal frame structure.

As noted above, a majority of the peripheral expansion module may be positioned outside of the main housing unit along one side of the portable electronic device, such as a top side, a bottom side, a right side or a left side of the portable electronic device. In some embodiments, it may be desirable to configure the peripheral expansion module, such that a portion of the peripheral expansion module extends inside the main housing unit, as this would provide additional support in the vertical direction, as well as overlapping regions for environmental seals. Specifically, the peripheral expansion module may be configured, such that a first portion of the module housing comprising the peripheral devices lies adjacent to one end of the main housing unit, while a second portion of the module housing extends within the one end of the main housing unit. In this case, the second portion may be sandwiched between the front cover and the back cover of the main housing unit.

To prevent ingress of moisture, dirt or contaminants, one or more compressible seals may be arranged between the second portion of the peripheral module housing and the one end of the main housing unit. For example, a first compressible seal may be arranged between the second portion of the peripheral module housing and the front cover of the main housing unit, a second compressible seal may be arranged between the second portion of the module housing and the back cover of the main housing unit, a third compressible seal may be arranged between the second portion of the module housing and a top side of the main housing unit, and a fourth compressible seal may be arranged between the second portion of the module housing and a bottom side of the main housing unit. In other embodiments, a continuous seal may be arranged between the second portion of the module housing and the main housing unit, instead of the separate seals mentioned above.

According to another embodiment, a method is provided herein for assembling a peripheral expansion module to a portable electronic device. The portable electronic device may generally include a main housing unit having a first cover and a second cover which, when coupled together, enclose internal components of the portable electronic device. In addition, the peripheral expansion module may generally include a module housing comprising one or more peripheral devices and a pair of rails, which extend out from within an interior of the module housing for attachment via one or more mechanical fasteners to an interior surface of the main housing unit. The peripheral expansion module and the portable electronic device may be further configured as described herein.

In one embodiment, the method described herein may generally include: removing the first cover of the portable electronic device, positioning the peripheral expansion module adjacent to one side of the portable electronic device, attaching the peripheral expansion module to the portable electronic device by attaching the pair of rails to an interior surface of the main housing unit of the portable electronic device using the one or more mechanical fasteners, and replacing the first cover of the portable electronic device.

In some cases, the one or more mechanical fasteners used to attach the pair of rails to the interior surface of the main housing unit may be selected from a group consisting of screws, latches, clips, snaps and interlocking tabs. In other cases, alternative means may be used for securely attaching the rails to the interior surface of the main housing unit.

In some cases, additional method steps may be performed sometime before the step of replacing the first cover of the portable electronic device is performed. In one example, the method may further include connecting a flexible cable of the peripheral expansion module to a connector within the portable electronic device. The flexible cable may be configured to transfer power and/or data signals between the peripheral expansion module and the portable electronic device, so as to functionally integrate the peripheral expansion module with the portable electronic device.

BRIEF DESCRIPTION OF THE DRAWINGS

Other objects and advantages of the invention will become apparent upon reading the following detailed description and upon reference to the accompanying drawings in which:

FIG. 1A is a plan view illustrating a front side of an exemplary portable electronic device;

FIG. 1B is a plan view illustrating a top side of the exemplary portable electronic device;

FIG. 1C is a plan view illustrating a back side of the exemplary portable electronic device;

FIG. 1D is a plan view illustrating a bottom side of the exemplary portable electronic device;

FIG. 1E is a plan view illustrating a right side of the exemplary portable electronic device;

FIG. 1F is a plan view illustrating a left side of the exemplary portable electronic device;

FIG. 2 is a 3D view illustrating the exemplary portable electronic device having a peripheral expansion module securely integrated therewith;

FIG. 11 is an exploded 3D view illustrating one manner in which a peripheral expansion module may be integrated with a portable electronic device, according to a fourth embodiment of the invention.

Figure 3:
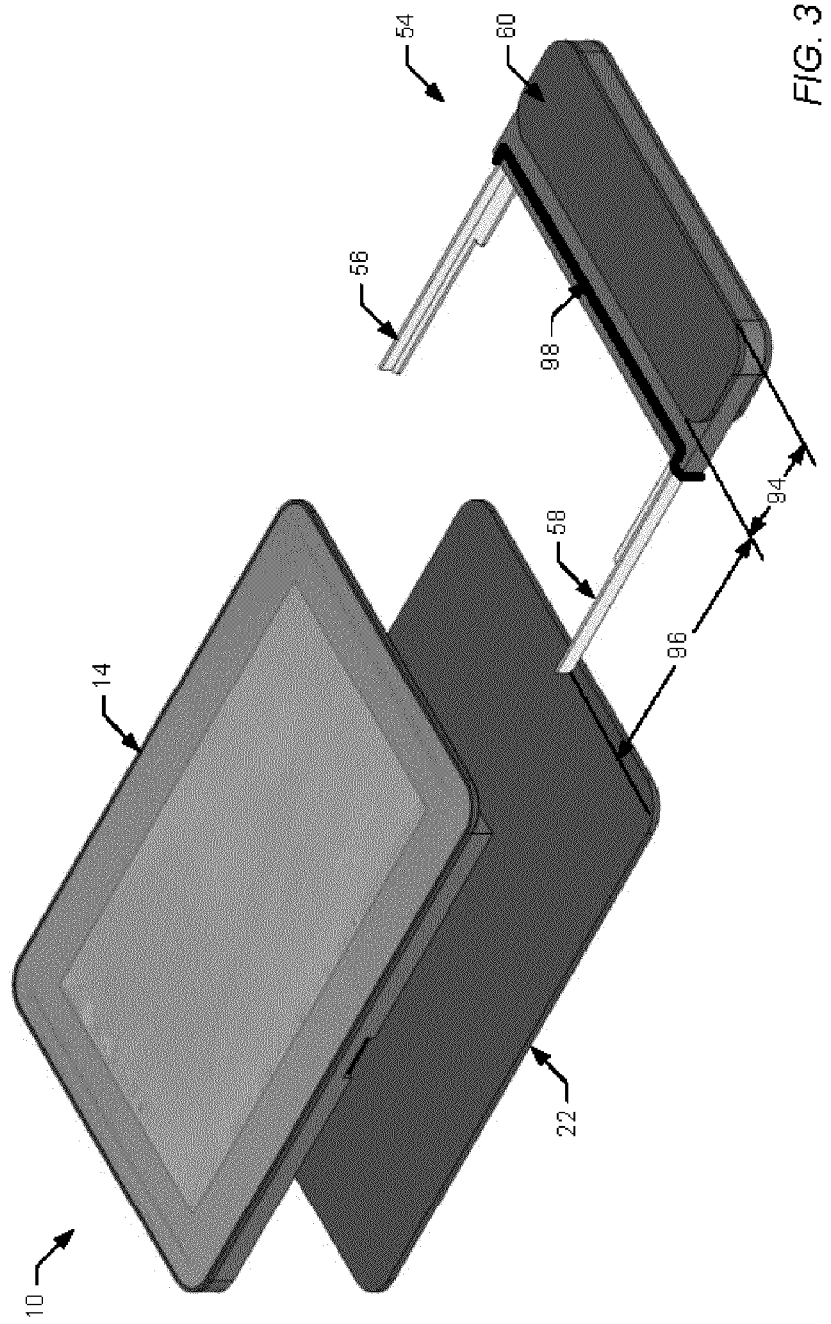
FIG. 3 is an exploded 3D view illustrating one manner in which a peripheral expansion module may be securely integrated with the portable electronic device, according to a first embodiment of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

With the advent of portable electronic devices, especially portable computing devices, device manufactures have encountered the problem of how to integrate peripheral devices (such as keyboards, pointing devices, USB hubs, hard disk drives, etc.) with their portable electronic devices. In the past, device manufacturers have chosen to integrate peripheral devices by inserting the peripheral devices into an expansion bay of the portable electronic device, connecting the peripheral device directly to the portable electronic device by way of a cable, connecting the portable electronic device to a docking station having one or more peripheral devices coupled thereto, or in some cases, attaching a peripheral device to an external surface of the electronic device housing by way of an easy connect/disconnect feature (such as latches, retention clips, or guide rails and grooves). However, conventional integration solutions fail to provide the portability, flexibility and security desired by today's consumers.

As market trends gravitate toward ultra-portable electronic devices (e.g., tablet computers, smart phones, media players etc.), and the use of such devices in medical, industrial and retail applications, the problem of integrating peripherals with portable electronic devices has changed. Now, consumers demand ultra-light weight electronic devices with peripheral device support chosen to meet their specific needs. For example, retail customers demand ultra-portable electronic devices having barcode scanning and magnetic stripe reading capabilities to facilitate inventory and point-of-sale (POS) applications. In addition, medical personnel desire portable electronic devices having various communication, imaging and data capture capabilities (e.g., WiFi® and Bluetooth® radios, cameras, RFID readers, etc.) to support documentation and communication of patient status and records. As the demand for customization increases, and the size and weight of portable electronic devices decreases, the integration problem becomes more complex.

The present invention solves the current integration problem by providing a peripheral expansion module that includes one or more peripheral devices chosen, e.g., to meet specific end-user needs. In one example, a first peripheral expansion module may be provided with a barcode scanner and a magnetic stripe reader to meet the needs of the retail community. In another example, a second peripheral expansion module may be provided with various communication, imaging and data capture capabilities to meet the needs of the medical community. Additional expansion modules may be provided to meet the needs of other industries or end-users.

Unlike some conventional integration schemes (e.g., expansion bays), which include the structure for supporting peripheral devices into the portable electronic device, the present invention provides a peripheral expansion module having its own supporting structure. In particular, the peripheral expansion module described herein is provided with a peripheral module housing, which comprises one or more peripheral devices, and includes a front cover and a back cover for housing internal components of the peripheral expansion module. Several advantages are gained by providing the expansion module with its own supporting structure. First, it reduces the overall impact on the base electronic device, such as the cost, size and weight of the base electronic device. In addition, providing the expansion module with its own structure maintains the thin profile, which end-users have come to expect of their portable electronic devices. In some cases, providing the expansion module with its own structure may also preserve the docking interface used by the portable electronic device to recharge and connect to other devices.

In general, the peripheral expansion module described herein may be integrated with a portable electronic device at the time of manufacture, or subsequently added as an upgrade feature. However, unlike conventional integration schemes that strive to provide a quick and easy way to connect/disconnect a peripheral device to/from a portable electronic device, the present invention provides means for securely integrating the peripheral expansion module with the portable electronic device, so that the peripheral expansion module appears and behaves as a substantially seamless extension of the host device. In doing so, the present invention may prevent theft, accidental detachment of the peripheral expansion module from the host device, or damage caused to the expansion module or to the host device by mechanical forces.

Turning now to the drawings, FIGS. 1A-1F illustrate one embodiment of a portable electronic device 10. As used herein, a "portable electronic device" may be any mobile electronic device, such as a portable computer (e.g., a laptop computer, a notebook computer, or tablet computer), a personal digital assistant (PDA), a personal media player, a netbook, an e-reader or a mobile phone (e.g., a smart phone). In the illustrated embodiment, portable electronic device 10 is a tablet computer, one example of which is the Motion CL900 provided by Motion Computing, Inc. A tablet computer represents one portable electronic device that would benefit from the increased functionality provided by a peripheral expansion module. Thus, the inventive concepts provided herein will be described in the context of a tablet computer 10 to provide one example of a best mode for practicing the invention. It is noted, however, that the peripheral expansion module described herein is not limited to use with any particular make, model or type of portable electronic device, and may be integrated with substantially any portable electronic device benefiting from peripheral device support.

FIG. 1A is a plan view illustrating a front side of tablet computer 10, according to one embodiment. As known in the art, a tablet computer is a touch screen device that enables users to provide input to the computer via touch or through use of a stylus or pen. To facilitate such input, tablet computer 10 generally includes a touch-sensitive display screen 12 embedded within or arranged upon a front cover 14 of the device. In one embodiment, the touch-sensitive display screen 12 may be an approximately 10" wide dual bonded display with LED backlighting and an underlying digitizer. In some embodiments, the touch-sensitive display screen 12 may use capacitive or resistive touch sensors within a thin, light damage-resistant display material, such as Corning®

Gorilla® Glass. In some embodiments, the display material may extend to the peripheral edges of the front cover 14, as shown in FIG. 1A, to provide a substantially seamless front surface, which reduces the areas through which moisture, dirt or contaminants can enter the computer. In other embodiments, however, the display material may be embedded within the front cover 14, such that seams exist where the touch-sensitive display screen 12 meets the front cover 14. In some embodiments, one or more devices, buttons or indicators may be included on the front side of the table computer 10. For example, and as shown in the exemplary embodiment of FIG. 1A, the front side of the tablet computer may include a camera 16, an ambient light sensor 18 and a battery charge indicator 20.

FIG. 1B is a plan view illustrating a top side of tablet computer 10, according to one embodiment. In particular, FIG. 1B illustrates the front cover 14 as being tightly coupled to a back cover 22 of the tablet computer 10. When coupled together, the front and back covers enclose internal components of the tablet computer. Thus, the front and back covers form a main housing unit of the tablet computer. In the illustrated embodiment, a pair of microphones 24 and a speaker 26 are included on the top side of the tablet computer 10 for auditory input and output.

FIG. 1C is a plan view illustrating a back side of tablet computer 10, according to one embodiment. In particular, FIG. 1C shows one embodiment of the back cover 22 as including a rear camera 28, air vents 30 and rubber feet 32. The bottom side of the tablet computer 10 is shown in FIG. 1D. Like the top side, the front cover 14 is tightly coupled to the back cover 22 on the bottom side of the tablet computer for enclosing internal components of the tablet computer therein. In the embodiment of FIG. 1D, the bottom side of the tablet computer 10 includes a docking connector 34. Docking connector 34 may attach the tablet computer 10 to a docking station, which functions to connect the tablet computer to a monitor, keyboard, mouse, or other external devices.

In some embodiments, docking connector 34 may be a pinless connector that allows the computer to be connected to a docking station without the need for a traditional male or female docking connector. In such embodiments, pinless connector 34 may comprise a flat surface that is easy to clean and disinfect, as compared to a traditional docking connector that contains either pins or recesses that would make the connector very difficult to wipe clean.

FIGS. 1E and 1F are plan views respectively illustrating the right and left sides of the tablet computer 10, according to one embodiment. Like the top and bottom sides, the front cover 14 is tightly coupled to the back cover 22 on the right and left sides of the tablet computer 10 for enclosing internal components of the tablet computer therein. In addition, FIGS. 1E and 1F illustrate how various devices, buttons or indicators may be included on the right and left sides. In the illustrated embodiments, the right side of the tablet computer 10 (FIG. 1E) includes a pen tether attachment point 36, a pen release button 38 and a pen storage bay 40, while the left side of the tablet computer (FIG. 1F) includes a power button 42, a fan cover 44, a security button 46, and a battery gauge button 48. In addition, various memory card slots 50 (e.g., SD and SIM card slots) and connector ports 52 (e.g., a micro HDMI port, audio input/output jack, USB port and power adapter port) may be included on the left side of the tablet.

Although the various sides of the tablet computer are illustrated as having particular features, one skilled in the art would recognize that any number and/or type of devices, buttons, indicators or ports may be included on the various sides without departing from the scope of the invention. The feature set provided on an exemplary tablet computer is discussed herein for the purpose of aiding the description of an exemplary method for assembling a peripheral expansion module to a particular portable electronic device. However, a skilled artisan would understand how the assembly method set forth below may differ when connecting a peripheral expansion module in accordance with the present invention onto a somewhat different portable electronic device.

FIG. 2 is a 3D view illustrating a peripheral expansion module 54 assembled onto tablet computer 10, according to one embodiment of the invention. In particular, FIG. 2 illustrates a peripheral expansion module 54 securely integrated with tablet computer 10, such that the peripheral expansion module 54 appears and behaves as a substantially seamless extension of computer 10. In the embodiment of FIG. 2, the peripheral expansion module 54 is integrated onto the right side (FIG. 1E) of the tablet computer 10. To maintain the appearance of seamless integration, the peripheral expansion module 54 is configured, in preferred embodiments, as having substantially the same length (L) and thickness (T) as the tablet computer 10. In other words, the peripheral expansion module 54 shown in FIG. 2 is preferably configured so that only the width (W) of the tablet computer 10 is increased when the peripheral expansion module is assembled thereto.

Although the peripheral expansion module 54 is assembled onto the right side of the table computer 10 in the illustrated embodiment, one skilled in the art would recognize how the module could easily have been assembled onto other sides of the tablet without departing from the scope of the invention. In some embodiments, for example, the peripheral expansion module 54 shown in FIG. 2 could have been assembled onto the left side (FIG. 1F) of the tablet computer 10. In other embodiments, a slightly different peripheral expansion module may be assembled onto the top side (FIG. 1B) of the tablet computer 10, so that the length of the computer is increased, instead of the width. In other embodiments, a peripheral expansion module may be assembled onto the bottom side of a portable electronic device. However, it may not be desirable to assemble a peripheral expansion module onto the bottom side (FIG. 1D) of the tablet computer 10, unless the docking connector 34 included on the bottom side of the tablet computer 10 is replicated on the bottom side of the peripheral expansion module.

FIG. 3 is an exploded 3D view illustrating one manner in which the peripheral expansion module 54 may be assembled onto the tablet computer 10, according to one embodiment of the invention. In particular, FIG. 3 shows the back cover 22 removed from the front cover 14 of the tablet computer 10. In order to securely integrate the peripheral expansion module 54 with the tablet computer 10, module 54 is provided with a pair of rails 56, 58, which extend out from within an interior of a module housing 60 for attachment to an interior surface of the main housing unit of the tablet computer. As described in more detail below, the pair of rails may be securely attached to an inside surface of the front cover 14, an inside surface of the back cover 22 or an internal frame structure coupled within the main housing unit of the tablet computer 10. Regardless, the pair of rails 56, 58 may be securely attached using a variety of attachment means.

Figure 4:
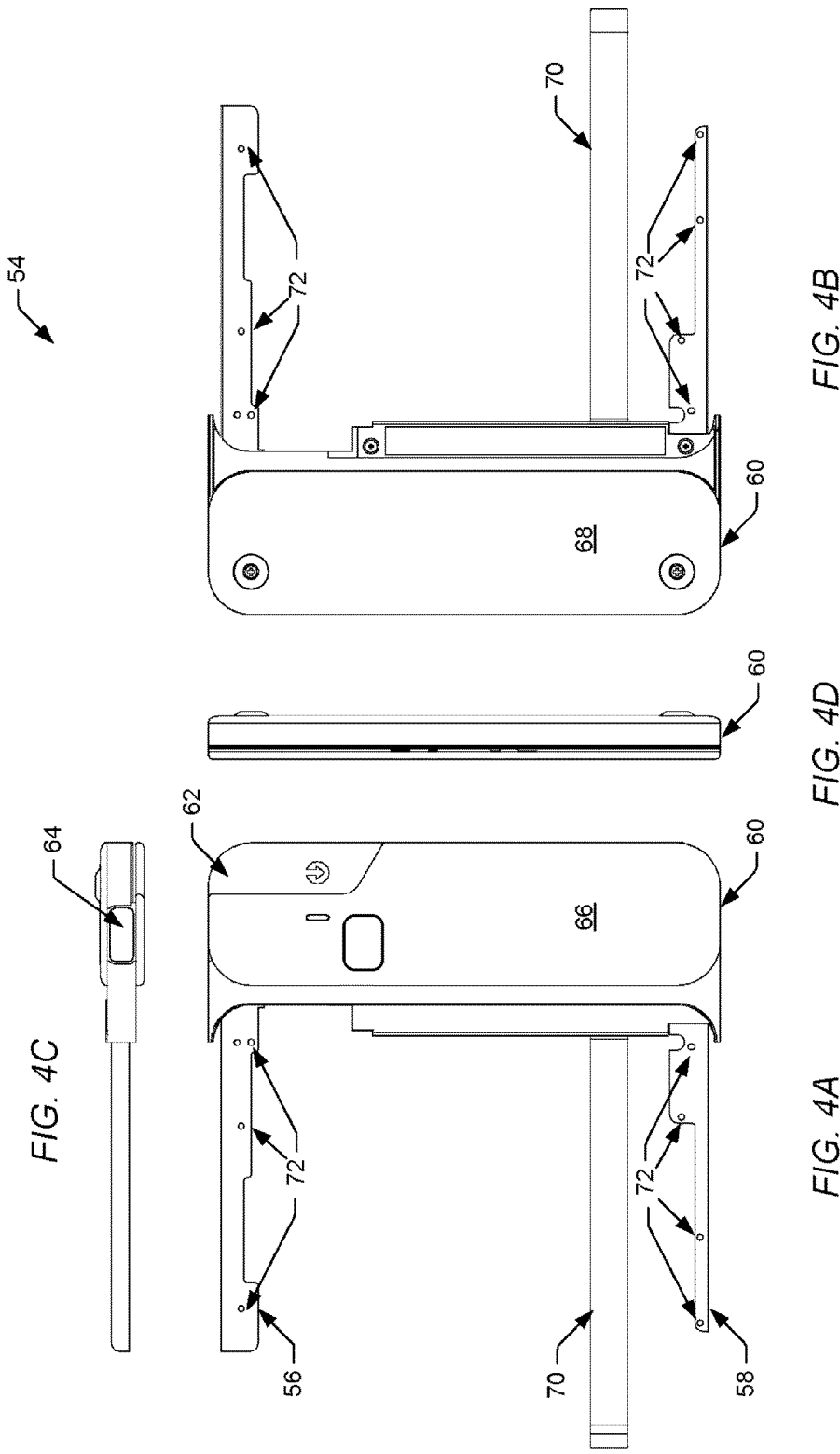
FIGS. 4A-4D are plan views illustrating various sides of the peripheral expansion module, according to the first embodiment of the invention.

FIGS. 4A-4D are plan views illustrating various sides of the peripheral expansion module 54, according to one embodiment of the invention. In particular, FIG. 4A illustrates an exemplary front side of module 54, FIG. 4B illustrates an exemplary back side of module 54, FIG. 4C illustrates an exemplary top side of module 54 and FIG. 4D illustrates an exemplary right side of module 54. In the illustrated embodiment, the peripheral expansion module 54 is depicted as including a magnetic stripe reader 62 on the front side of the module (FIG. 4A) and a barcode scanner 64 on the top side of the module (FIG. 4C). However, peripheral expansion module 54 is not limited to including any particular type, number or placement of peripheral devices.

In general, the peripheral expansion module described herein may comprise one or more peripheral devices including, but not limited to, magnetic stripe readers/writers, barcode scanners, smart card readers, chip & PIN card readers, cameras, RFID readers, radio modules, thermometers, electronic rangefinders, fingerprint readers, GPS modules, and the like. In addition, the peripheral expansion module may include one or more ports, connectors or interfaces for accessing any number of external devices, which may be physically or functionally linked to the peripheral expansion module while residing outside of the peripheral module housing 60 (such as, e.g., thermometers, automobile or equipment diagnostic and control electronics, etc.). The peripheral devices illustrated herein are for explanatory purposes and should not be considered to limit the invention to a particular number or type of peripheral device.

As shown in FIGS. 4A-4D, the peripheral expansion module 54 generally includes a module housing 60 having one or more peripheral devices, a front cover 66 and a back cover 68. The front cover 66 and back cover 68 of the module housing 60 are coupled together for enclosing internal components of the peripheral expansion module (e.g., electronic circuitry associated with the one or more peripheral devices). In addition, the peripheral expansion module 54 includes a pair of rails 56, 58, which extend out from within an interior of the module housing 60 for attachment to an interior surface of the main housing unit of the tablet computer 10. Furthermore, a flexible cable 70 is provided for transferring power and/or data signals between the peripheral expansion module 54 and the tablet computer 10.

The rails 56, 58 may be securely attached to the interior surface of the main housing unit of tablet computer 10 using various attachment means. In one embodiment, each rail may be securely attached using one or more screws. Thus, rails 56, 58 are depicted in FIGS. 4A-4B as including a number of holes 72 for accepting a plurality of screws 82 (see FIGS. 7A-7B). However, the attachment means described herein are not limited to screws, and may alternatively include other mechanical fasteners (e.g., latches, snaps, clips, interlocking tabs, or any other means for securely attaching the rails to the interior surface of the main housing unit) in alternative embodiments of the invention. In some embodiments, the attachment of rails 56, 58 to the interior surface of the main housing unit can be made permanent and irreversible, for example, through the use of interference fit bosses, solder joints, and/or adhesives. By securely attaching the rails 56, 58 to the interior surface of the main housing unit, the attachment means described herein may prevent theft and/or accidental detachment of the peripheral expansion module 54 from the tablet computer 10.

In addition to providing secure attachment between the tablet computer 10 and the peripheral expansion module 54, the rails 56, 58 may be specifically configured for transferring a load from the peripheral expansion module 54 to the tablet computer 10. For example, if a user holds the tablet computer 10 by the peripheral expansion module 54, a significant force may be applied to an interface 90 (see FIG. 7B) between the computer and the module. On the other hand, the peripheral expansion module 54 may be subject to impact forces if the tablet computer 10 were dropped or otherwise hit against a hard surface. These forces or loads must be distributed to the structure of the computer to prevent damage within the peripheral expansion module 54, damage within the computer 10, or damage at the interface 90 between the peripheral expansion module and the computer. As described below, loads may be distributed to the structure of the computer in a number of different ways.

First, loads may be transferred from the peripheral module housing 54 to the pair of rails 56, 58 contained therein by securely attaching the rails to an inside surface of the peripheral module housing 60. In some cases, the rails may be integrally formed with the inside surface of the peripheral module housing, such as an inside surface of the front cover 66 or an inside surface of the back cover 68 of the peripheral module housing 60. In other cases, the rails may be tightly attached to the inside surface of the peripheral module housing 60 using one or more of the mechanical fasteners mentioned above.

Figure 5:
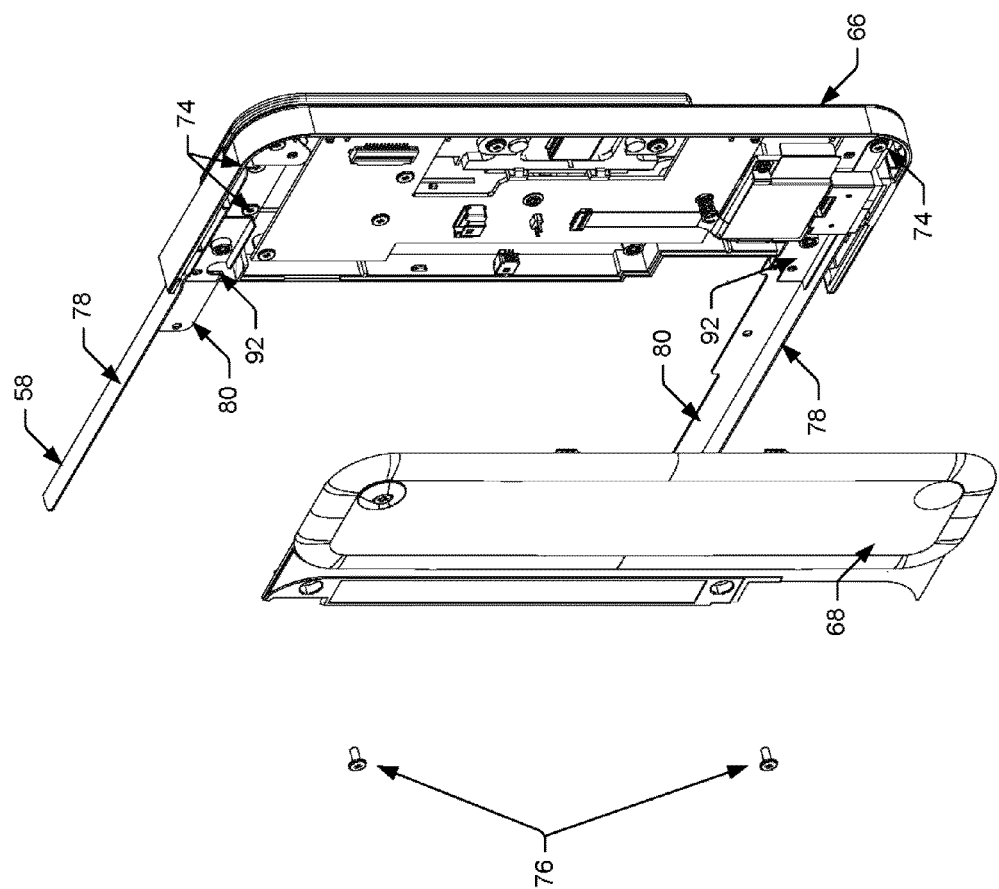
FIG. 5 is an exploded 3D view of the peripheral expansion module shown in FIG. 4 illustrating one manner in which a pair of rails may be attached to an inside surface of the peripheral expansion module, according to one embodiment.

For example, and as shown in the embodiment of FIG. 5, one or more screws 74 may be used to securely attach each rail 56, 58 to an inside surface of the front cover 66 of the peripheral module housing 60. In addition, the rails 56, 58 may be sandwiched between the front 66 and back 68 covers of the peripheral module housing 60, so that each cover comes in contact with the rails to effectively transfer loads thereto. In the embodiment of FIG. 5, contact is made by configuring a vertical portion 78 of the rails, such that the height of the rails is sufficient to contact the inside surfaces of the front cover 66 and the back cover 68 when assembled. In FIG. 5, the front and back covers of the peripheral module housing 60 are assembled together using a pair of screws 76. However, one skilled in the art would understand how alternative measures could be taken to assemble the front and back covers in alternative embodiments of the invention.

In order to transfer loads from the rails 56, 58 to the tablet computer 10, the rails 56, 58 are preferably configured to be strong and stiff without adding significant weight or consuming too much internal space within the peripheral module housing 60 or the tablet computer 10 itself. In order to minimize weight, the rails may be formed from a thin sheet or strip of metal or metal alloy, in some embodiments of the invention. In one example, the rails may be formed from a 0.5 mm thick piece of half-hard stainless steel, or some other metal or metal alloy, although the material or manufacturing process choice for the rails is not limited to such. To strengthen the rails, resist torsional forces and conserve internal space within the peripheral expansion module 54 and the tablet computer 10, the rails 56, 58 may be oriented parallel to one another and positioned along opposite inside surfaces of the peripheral module housing 60. For example, and as shown in FIG. 5, rail 58 may be arranged within the peripheral module housing 60 adjacent to a top side, while rail 56 is arranged within the module housing 60 adjacent to a bottom side of the module housing. Positioning the rails adjacent to the top and bottom inside surfaces of the peripheral module housing 60 effectively increases the strength of the rails by allowing the rails to come in contact with the inside surfaces.

To further strengthen the rails, each rail may be formed in an "L" shape to resist bending in the horizontal and vertical directions. As used herein, the "horizontal direction" is the direction substantially parallel with the tablet's display surface, and the "vertical direction" is the direction substantially normal to the display surface. As shown in the exemplary embodiment of FIG. 6, each rail 56, 58 may be formed having a vertical portion 78 and a horizontal portion 80 extending orthogonally from the vertical portion in an "L" shape. As shown in FIG. 5, the vertical portions 78 of the rails may be arranged adjacent to the top and bottom sides of the module housing 60 to resist bending in the horizontal direction, while the horizontal portions 80 of the rails are arranged to resist bending in the vertical direction.

In some embodiments, loads may be distributed across the structure of the tablet computer 10 to decrease the amount of load applied to any particular part of the computer. To distribute loads across the structure of the computer, a length of each rail 56, 58 may be configured so that, when the peripheral expansion module 54 is integrated with the tablet computer 10, the rails 56, 58 extend into the main housing unit of the tablet computer 10 by more than 30% of a width of the main housing unit. In some cases, the rails may extend into the main housing unit by more than 40% of the main housing width, more than 50% of the main housing width, or even further, so as to distribute the loads over a large portion of the structure of the tablet computer 10. This is illustrated in the exemplary embodiment of FIG. 7B.

Figure 7A:
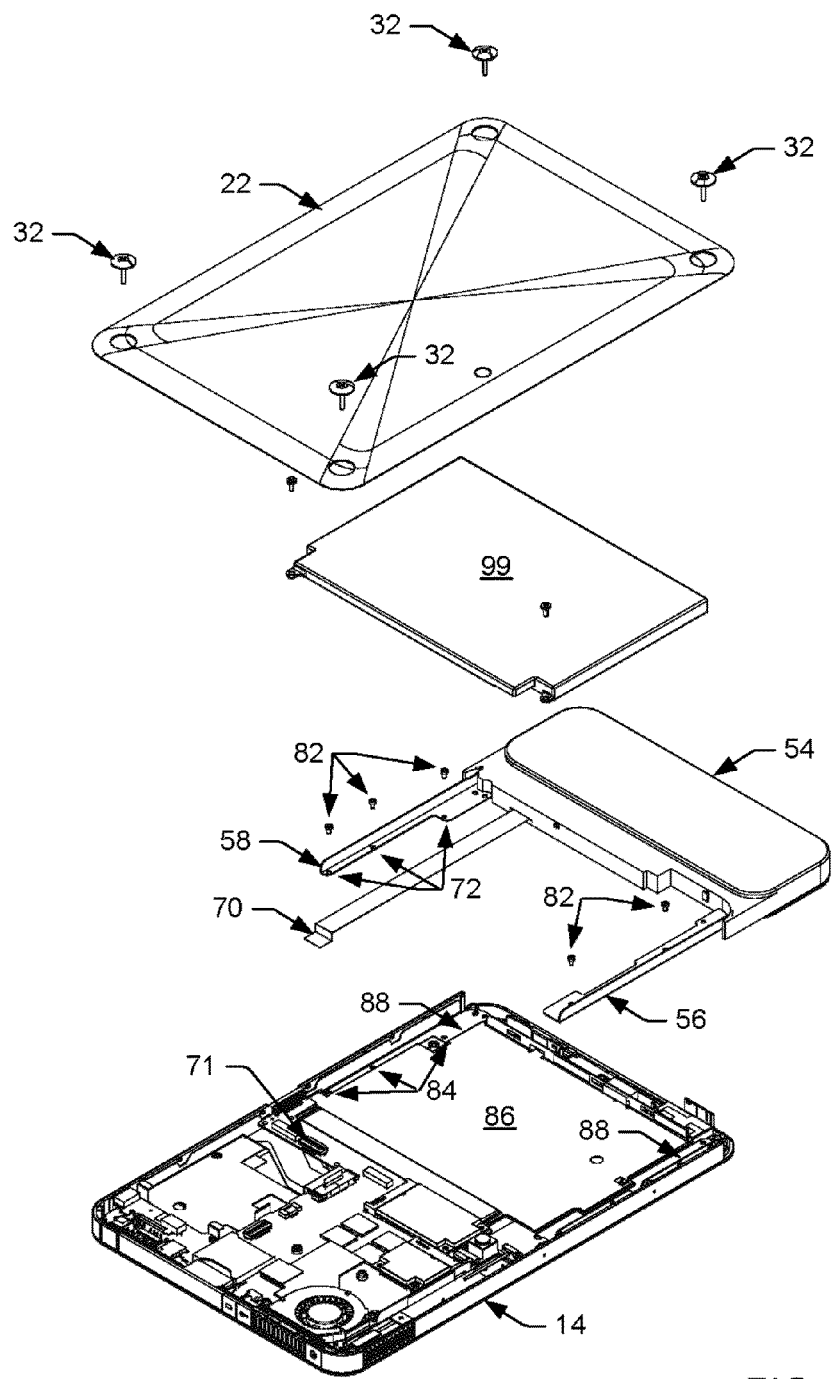
FIG. 7A is an exploded 3D view illustrating components of the portable electronic device and peripheral expansion module shown in FIGS. 1-2.
Figure 7B:
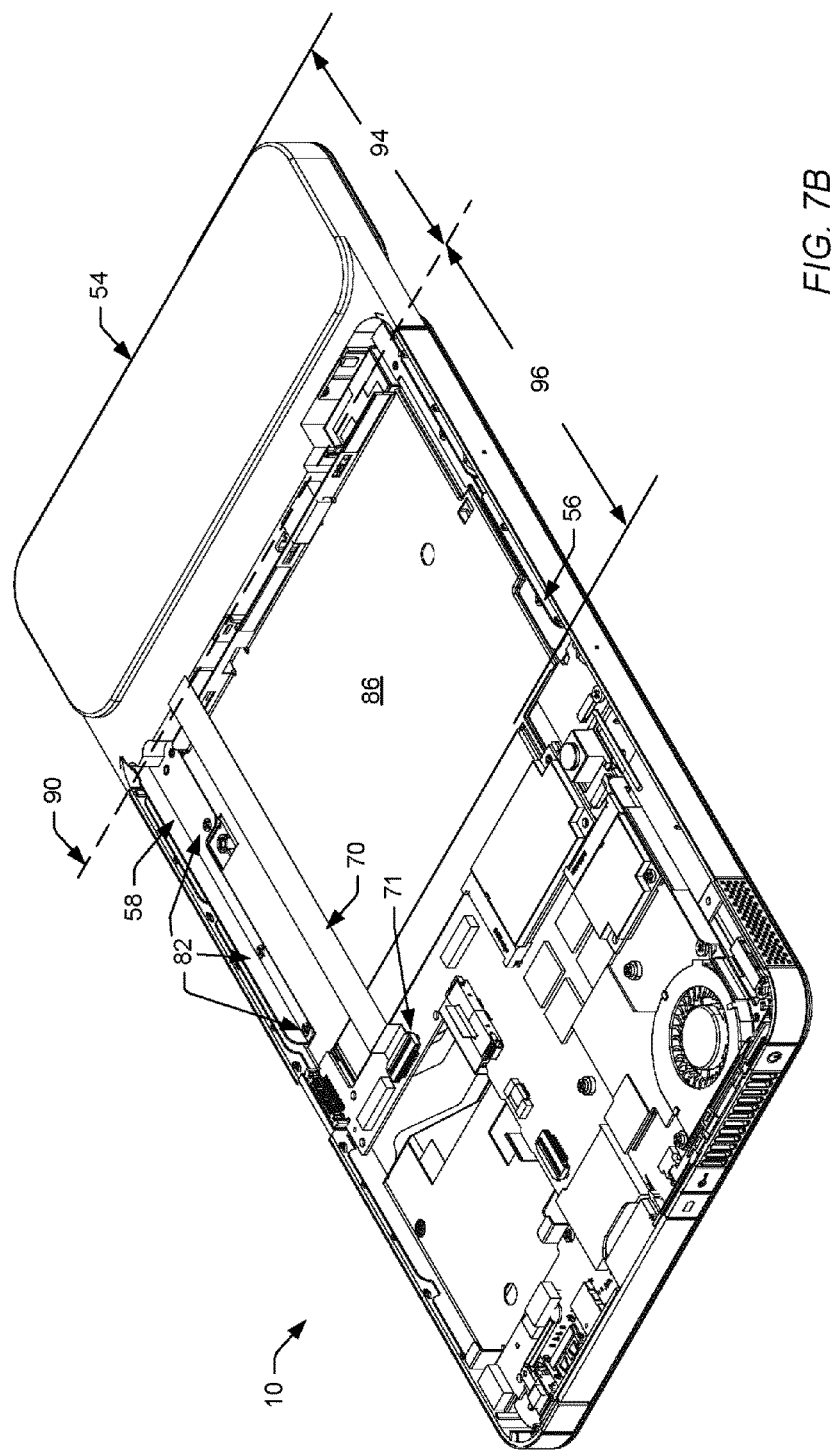
FIG. 7B is a 3D view illustrating one manner in which the rails of the peripheral expansion module may be attached to an interior surface of the portable electronic device, according to one embodiment.

FIG. 7A is an exploded 3D view illustrating various components of the tablet computer 10 and peripheral expansion module 54 prior to assembly. FIG. 7B is a 3D view illustrating one manner in which the peripheral module 54 may be assembled onto the tablet computer 10, specifically, showing how the rails 56, 58 of the peripheral expansion module 54 may be positioned within and attached to an interior surface of the tablet computer 10, according to one embodiment of the invention.

Figure 6:
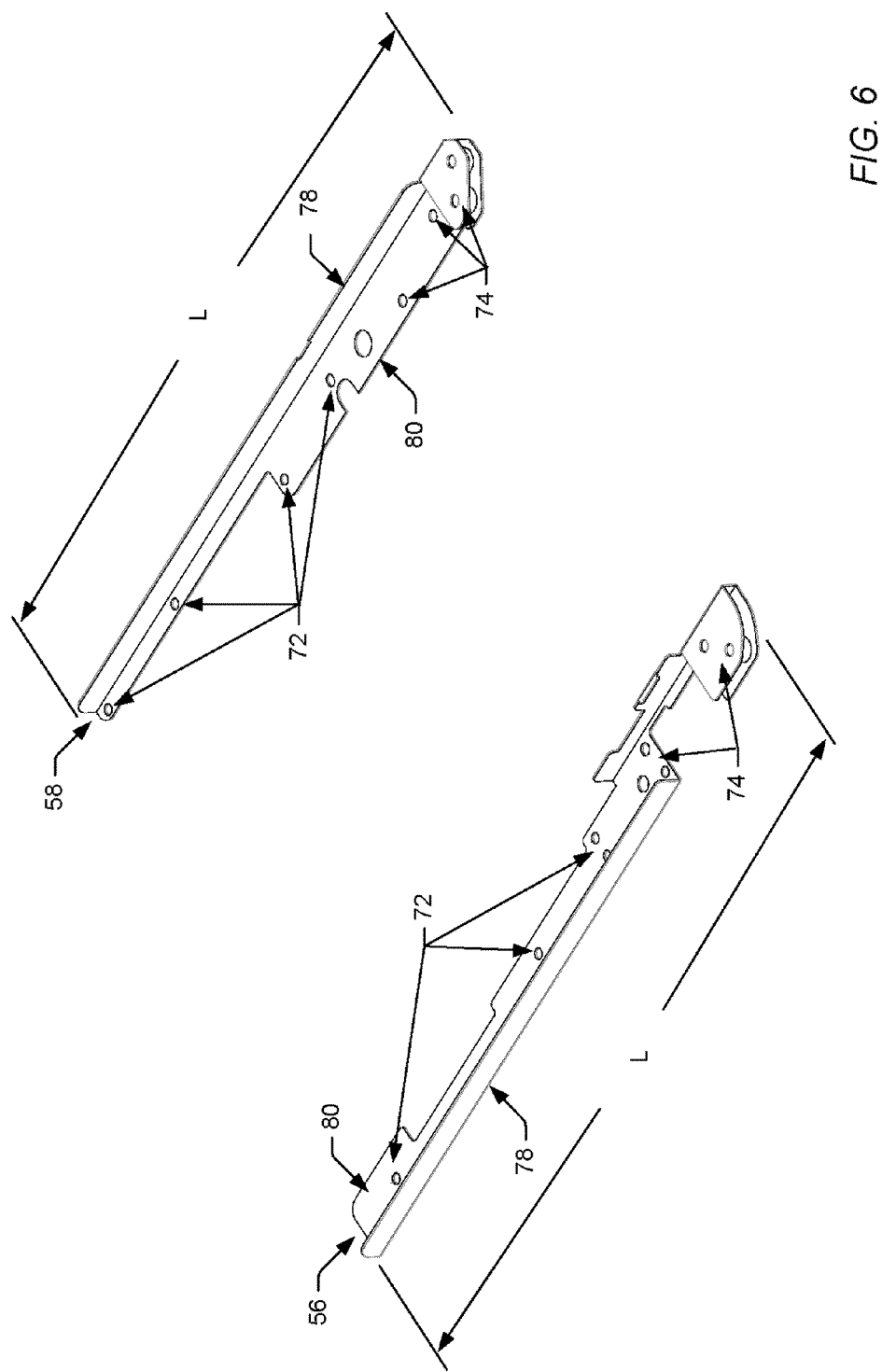
FIG. 6 is a 3D view of the pair of rails, according to one embodiment.

As shown in FIGS. 7A and 7B, each rail 56, 58 is attached to an interior surface of the main housing unit by inserting screws 82 through holes 72 formed within the rails and into a threaded boss 84 formed within the interior surface of the main housing unit. As shown in FIGS. 6 and 7, the holes 72 and threaded bosses 84 provide a plurality of attachment locations, which are distributed along the length of each rail 56, 58. This enables the loads being transferred between the rails and the structure of the tablet to be distributed across multiple attachment locations, so that no single location receives all of the load.

In some embodiments, tablet computer 10 may include an internal frame structure 86, which is arranged within the main housing unit for supporting and/or shielding one or more internal components of the tablet computer 10. In such embodiments, the rails 56, 58 may be additionally or alternatively attached via the screws 82 to the internal frame structure 86 of the tablet computer, so that at least some of the load is distributed across the internal frame structure.

In some cases, depressions 88 may be formed within the internal frame structure 86 for receiving the rails and to further assist in distributing the load across the internal frame structure. In some embodiments, the shape of depressions 88 may be similar to that of the rails 56, 58. In some embodiments, the shape of the depressions 88 and/or the shape of the rails 56, 58 may be selected to accommodate internal components of the tablet computer 10.

In some embodiments, the shape of the depressions 88 and/or the shape of the rails 56, 58 may be additionally or alternatively selected to more effectively distribute loads across the internal frame structure 86. For example, a portion of each rail 56, 58 near an interface 90 between the peripheral module housing 60 and the main housing unit of the tablet computer 10 may be reinforced, e.g., with greater width, to resist bending at the interface. In some embodiments, the portion of the rails 56, 58 at the interface 90 may be additionally or alternatively reinforced with a support plate 92 (see, FIG. 5). Other means for reinforcement may be used in other embodiments of the invention.

In some embodiments, it may be desirable to configure the peripheral expansion module 54, such that a portion of the peripheral expansion module extends inside the main housing unit of the tablet computer 10. Specifically, the peripheral expansion module 54 may be configured, such that a first portion 94 of the module housing 60 lies adjacent to one end of the main housing unit, while a second portion 96 of the module housing 60 extends within the one end of the main housing unit when the module is assembled to the tablet (see, FIGS. 2, 3 and 7B). In such embodiments, the second portion 96 of the module housing 60 may be sandwiched between the front cover 14 and the back cover 22 of the main housing unit (see, FIG. 2) to provide additional support in the vertical direction, as well as overlapping regions for environmental seals.

To prevent ingress of moisture, dirt or contaminants, one or more compressible seals 98 (See, FIG. 3) may be arranged between the second portion 96 of the peripheral module housing 60 and the one end of the main housing unit. For example, a first compressible seal may be arranged between the second portion 96 of the module housing 60 and the front cover 14 of the main housing unit, a second compressible seal may be arranged between the second portion 96 of the module housing 60 and the back cover 22 of the main housing unit, a third compressible seal may be arranged between the second portion 96 of the module housing 60 and a top side of the main housing unit, and a fourth compressible seal may be arranged between the second portion 96 of the module housing 60 and a bottom side of the main housing unit. In other embodiments, a continuous compressible seal may be arranged between the second portion 96 of the module housing 60 and the main housing unit, instead of the separate seals mentioned above.

Figure 8:
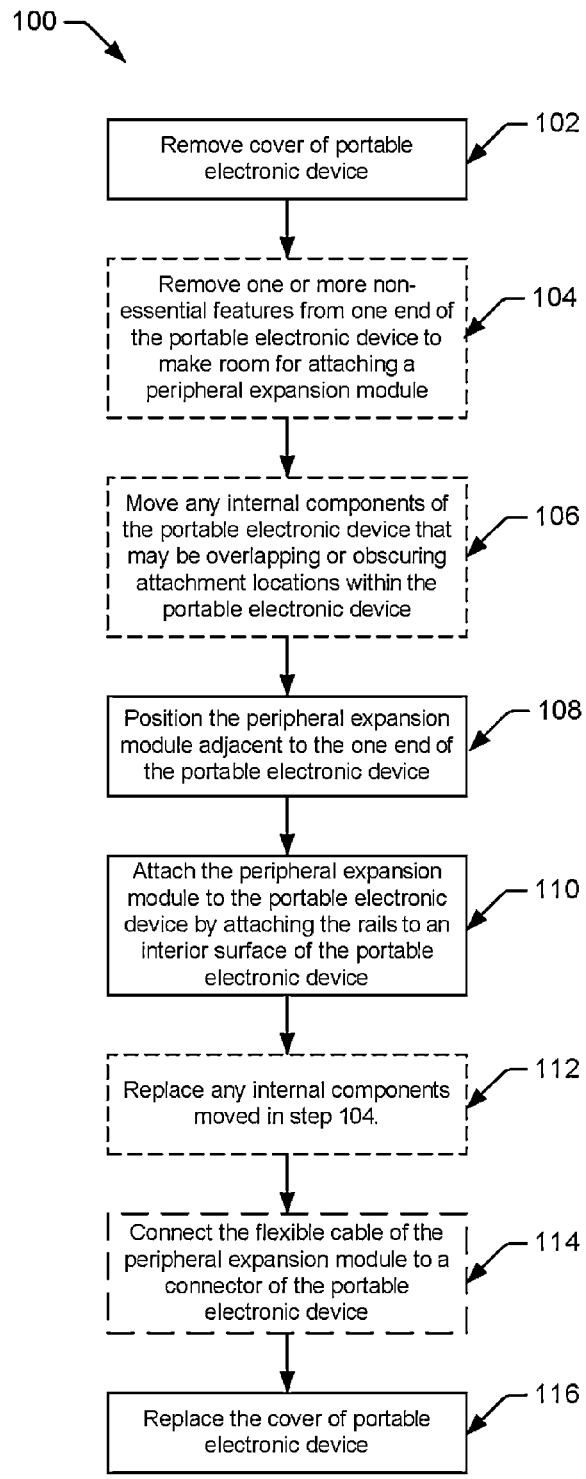
FIG. 8 is a flow chart diagram illustrating an exemplary method for assembling a peripheral expansion module to a portable electronic device, according to one embodiment of the invention.

An exemplary method for assembling a peripheral expansion module to a portable electronic device is shown in FIG. 8. The assembly method of FIG. 8 is specific to the peripheral expansion module 54 and the tablet computer 10 shown in FIGS. 1-7. As such, the assembly method shown in FIG. 8 includes one or more optional steps (indicated by dotted lines) that may or may not be performed when assembling the peripheral expansion module 54 to other portable electronic devices. In general, the assembly method described herein may be used to assemble a peripheral expansion module onto a portable electronic device at the time of manufacture, or sometime thereafter as an upgrade feature. However, as the method involves removing a cover of the portable electronic device and exposing internal components of the device, it is not generally preferred that the method be performed by the end-user.

In one embodiment, the method 100 may begin by removing a cover of the portable electronic device (in step 102). For example, and as shown in FIG. 7A, a back cover 22 of the tablet computer 10 may be removed by removing the screws located within rubber feet 32. Although a back cover is removed in the exemplary embodiment, it is possible to remove the front cover 14 of the tablet computer 10 without departing from the scope of the invention.

In some embodiments, it may be necessary to remove one or more non-essential features from one end of the tablet computer 10 to make room for the peripheral expansion module 54 (in optional step 104). For example, and as shown in FIG. 1E, it may be necessary to remove the pen tether attachment point 36, pen release button 38 (and latch, not shown) and pen storage bay 40 originally included on the right side of the tablet computer 10. However, as these features are specific to tablet computer 10, and may not be included on other portable electronic devices, it may not be necessary to perform this step in all embodiments of the invention.

In some embodiments, one or more internal components of the portable electronic device may be overlapping or obscuring the attachment locations, which are included within the portable electronic device for attaching the peripheral expansion module thereto. For example, a battery pack (99) included within tablet computer 10 may be positioned overlying the internal frame structure 86 and attachment locations 84 of the tablet computer 10. In such embodiments, it may be necessary to temporarily move any internal components (such as the battery 99 included within tablet 10) that may be overlapping or obscuring the attachment locations (in optional step 106).

Once the back cover 22 is removed and the attachment locations are accessible, the peripheral expansion module 54 may be positioned adjacent to one side of the tablet computer 10 (in step 108). For example, the peripheral expansion module 54 may be positioned adjacent to the right side of the tablet computer 10, as shown in the exemplary embodiment of FIGS. 7A and 7B. More specifically, the peripheral expansion module 54 may be positioned such that a first portion 94 of the module housing 60 lies adjacent to one end of the main housing unit, while a second portion 96 of the module housing 60 extends within the one end of the main housing unit. In some embodiments, it may be necessary to position the peripheral expansion module 54, such that the holes 72 formed within the rails 56, 58 are properly aligned with the threaded bosses 84 formed within the internal frame structure 86 and/or front cover 14 of the tablet computer 10.

Once positioned, the peripheral expansion module 54 may be attached to the tablet computer 10 by attaching the rails 56, 58 to an interior surface of the main housing unit of the tablet computer (in step 110). For example, and as shown in FIGS. 7A and 7B, each rail 56, 58 may be attached to an interior surface of the main housing unit by inserting screws 82 through the holes 72 formed within the rails and into a threaded boss 84 formed within the interior surface of the main housing unit. However, the attachment means described herein are not limited to screws, and may alternatively include other mechanical fasteners (e.g., latches, snaps, clips, interlocking tabs, or any other means for securely attaching the rails to the interior surface of the main housing unit) in alternative embodiments of the invention. In some embodiments, the attachment of rails 56, 58 to the interior surface of the main housing unit can be made permanent and irreversible, for example, through the use of interference fit bosses, solder joints, and/or adhesives.

In some embodiments, it may be necessary to attach the rails 56, 58 to the peripheral expansion module 54 before the module and rails are attached to the interior surface of the tablet computer 10. For example, and as shown in FIG. 5, one or more screws 74 may be used to securely attach each rail 56, 58 to an inside surface of the front cover 66 of the peripheral module housing 60. However, the attachment means described herein are not limited to screws, and may alternatively include other mechanical fasteners (e.g., latches, snaps, clips, interlocking tabs, or any other means for securely attaching the rails to the interior surface of the main housing unit) in alternative embodiments of the invention. In some embodiments, the attachment of rails 56, 58 to the inside surface of the peripheral module housing 60 can be made permanent and irreversible, for example, through the use of interference fit bosses, solder joints, and/or adhesives.

In some embodiments, the back cover 22 of the tablet computer 10 may be replaced once the peripheral expansion module 54 is securely attached to the interior surface of the tablet computer 10 (in step 116). In some embodiments, however, additional method steps may be performed sometime before the back cover of the tablet computer is replaced. For example, if any internal components of the tablet computer were moved in optional step 104, those components may be replaced in optional step 112. In another example, the method may further include connecting a flexible cable 70 of the peripheral expansion module 54 to a connector 71 within the tablet computer 10 (in optional step 114). The flexible cable 70 may be configured to transfer power and/or data signals between the peripheral expansion module 54 and the tablet computer 10, so as to functionally integrate the peripheral expansion module with the tablet computer.

One embodiment of a peripheral expansion module 54 and method 100 for assembling a peripheral expansion module to a portable electronic device 10 has now been described with specific reference to FIGS. 2-8. The peripheral expansion module and assembly method described herein improves upon conventional peripheral device integration schemes by providing a peripheral expansion module that: (a) includes one or more peripheral devices chosen to meet specific end-user needs, (b) has its own structure (thus, reducing the cost, size and weight of the base electronic device), and (c) is securely integrated with the base electronic device to prevent theft, accidental detachment or damage.

Figure 9:
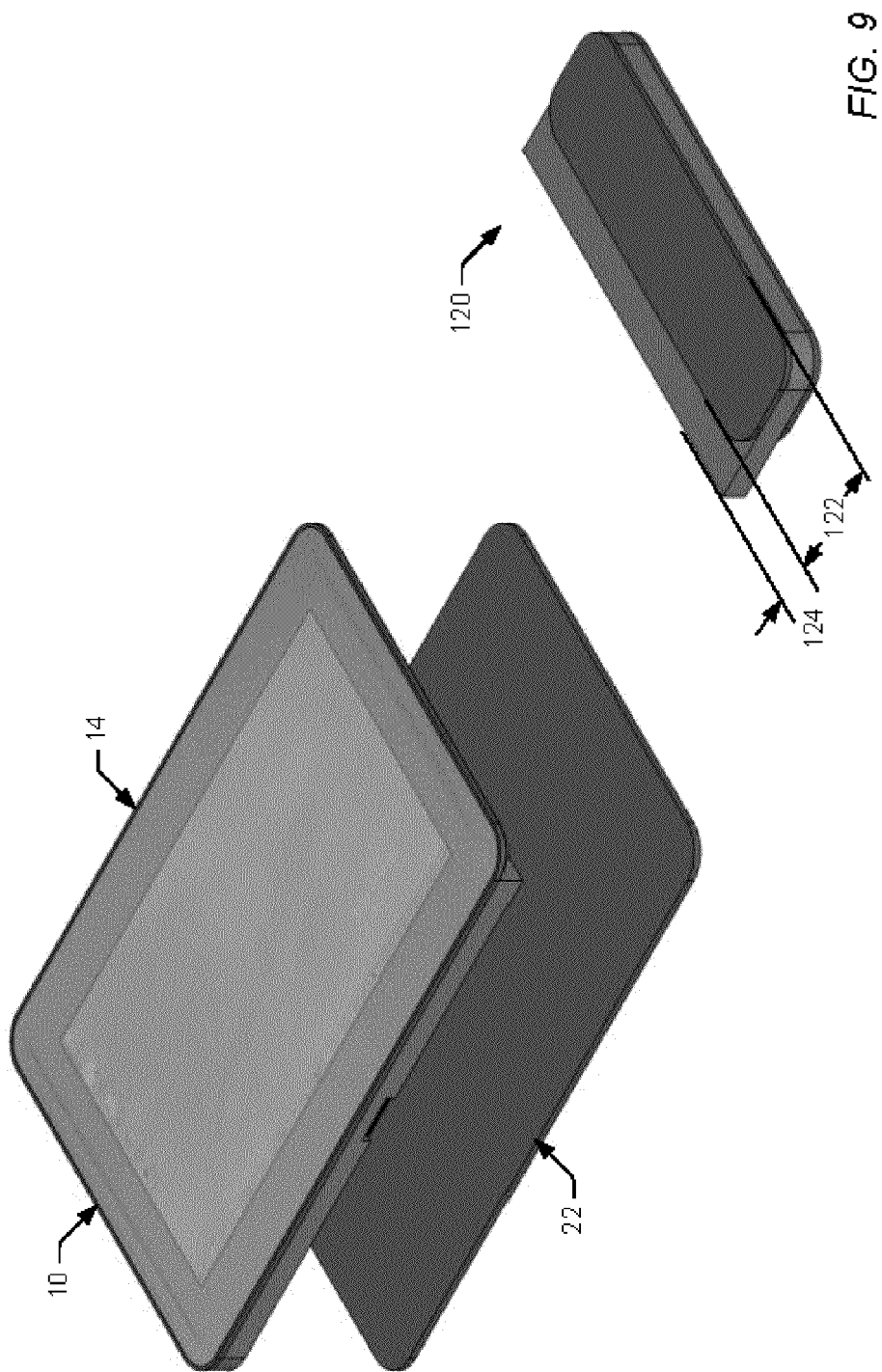
FIG. 9 is an exploded 3D view illustrating one manner in which a peripheral expansion module may be integrated with a portable electronic device, according to a second embodiment of the invention.
Figure 10:
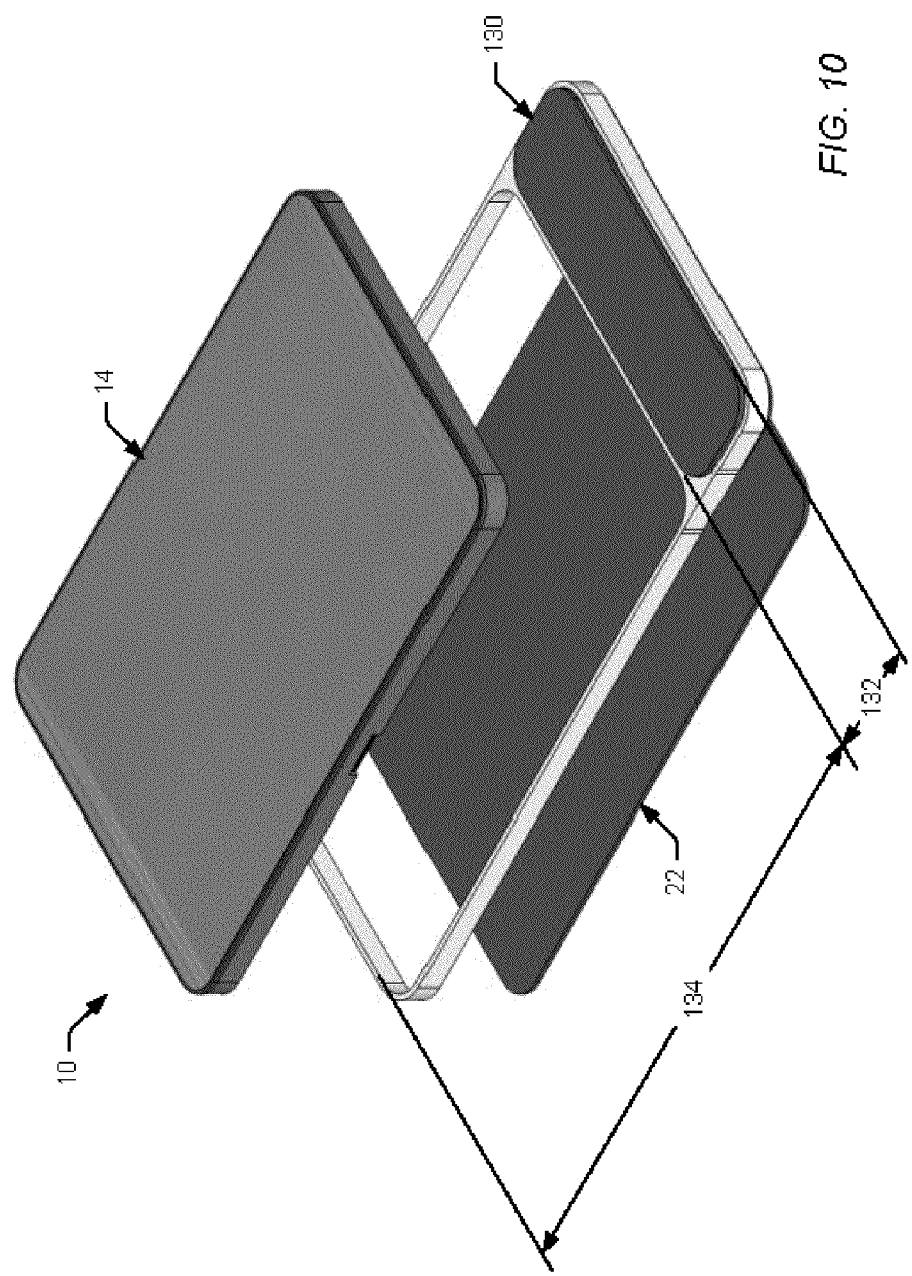
FIG. 10 is an exploded 3D view illustrating one manner in which a peripheral expansion module may be integrated with a portable electronic device, according to a third embodiment of the invention.

Although described and illustrated in FIGS. 2-8 as having particular features, the peripheral expansion module may be configured somewhat differently in alternative embodiments of the invention while retaining at least some of the inventive concepts set forth herein. Alternative embodiments of a peripheral expansion module are illustrated in FIGS. 9-11. In all embodiments, the peripheral expansion module described herein may comprise a module housing including one or more peripheral devices, a front cover and a back cover, which when coupled to the front cover, encloses internal components of the peripheral expansion module (such as electronic circuitry associated with the peripheral devices) therein. However, the peripheral expansion modules may be configured somewhat differently in the alternative embodiments shown in FIGS. 9-11. In addition, alternative means may be used for attaching the peripheral expansion modules shown in FIGS. 9-11 to the tablet computer 10.

For example, a peripheral expansion module 120 according to a first alternative embodiment is shown in FIG. 9. In this embodiment, the peripheral expansion module 120 includes a first portion 122 comprising one or more peripheral devices (not shown) and a second portion 124. Like the previous embodiment, the peripheral expansion module 120 may be assembled onto one side (e.g., the right side) of the main housing unit of tablet computer 10 by sandwiching the second portion 124 between the front cover 14 and the back cover 22 of the tablet computer. In one embodiment, the peripheral expansion module 120 may be assembled onto the one side of the tablet computer 10 by removing the back cover 22 of the tablet computer, positioning the peripheral expansion module 120 adjacent to the one side of the tablet computer, such that the second portion 124 extends within an interior of the tablet computer, attaching the second portion 124 to an interior surface of the tablet computer, and replacing the back cover 22 of the tablet computer. In some embodiments, the second portion 124 may be attached to the interior surface of the tablet computer using one or more of the mechanical fasteners mentioned above.

FIG. 10 illustrates a peripheral expansion module 130 according to another alternative embodiment. In this embodiment, the peripheral expansion module 130 includes a first portion 132 comprising one or more peripheral devices (not shown) and a second portion 134, which provides a perimeter housing around the sides of the front cover 14 of the tablet computer 10. In one embodiment, the peripheral expansion module 130 may be assembled onto the tablet computer 10 by removing the back cover 22 of the tablet computer, positioning the front cover 14 of the tablet computer 10 within the second portion 134 of the peripheral expansion module 130, such that the second portion 134 extends around and encompasses all side surfaces of the front cover 14, and replacing the back cover 22 of the tablet computer. In some embodiments, the front cover 14 may simply be snap fit into the second portion. In other embodiments, more secure means may be used to attach the peripheral expansion module 130 to the tablet computer 10. In some embodiments, a substantially larger back cover may be used in place of the original back cover to provide support for both the tablet computer 10 and the peripheral expansion module 130.

FIG. 11 illustrates a peripheral expansion module 140 according to yet another alternative embodiment. In this embodiment, the peripheral expansion module 140 includes a first portion 142 comprising one or more peripheral devices (not shown) and a second portion 144, which replaces the original back cover of the tablet computer 10 and provides support for both the tablet computer 10 and the peripheral expansion module 140. In one embodiment, the peripheral expansion module 140 may be assembled onto the tablet computer 10 by removing and discarding the original back cover (not shown) of the tablet computer 10, positioning the front cover 14 of the tablet computer, such that the front cover overlies the second portion 144 and lies adjacent to the first portion 142, and attaching the second portion 144 of the peripheral expansion module 140 to the front cover 14 of the tablet computer. In some embodiments, the front cover 14 may simply be snap fit onto the second portion 144. In other embodiments, more secure means may be used to attach the peripheral expansion module 140 to the tablet computer 10.

It will be appreciated to those skilled in the art having the benefit of this disclosure that this invention is believed to provide a peripheral expansion module and methods for assembling a peripheral expansion module to a portable electronic device. More specifically, the invention provides various means for securely integrating a peripheral expansion module, comprising one or more peripheral devices, with a portable electronic device. Further modifications and alternative embodiments of various aspects of the invention will be apparent to those skilled in the art in view of this description. It is intended, therefore, that the following claims be interpreted to embrace all such modifications and changes and, accordingly, the specification and drawings are to be regarded in an illustrative rather than a restrictive sense.

What is claimed is:

1. A portable electronic device, comprising:
    a main housing unit having a front cover and a back cover which, when coupled together, enclose internal components of the portable electronic device; and
    an expansion module comprising one or more peripheral devices coupled within or on a module housing, wherein a majority of the expansion module is positioned outside of the main housing unit along one side of the portable electronic device, wherein the expansion module further comprises a pair of L-shaped rails, which extend out from within an interior of the module housing for attachment to an interior surface of the main housing unit of the portable electronic device, and wherein each rail is attached to the interior surface of the main housing unit via a plurality of mechanical fasteners at a plurality of attachment locations, which are distributed along a length of each rail to distribute a load across the attachment locations.

2. The portable electronic device as recited in claim 1, wherein a first portion of the module housing lies adjacent to one end of the main housing unit, and wherein the first portion comprises the one or more peripheral devices.

3. The portable electronic device as recited in claim 2, wherein a second portion of the module housing extends within the one end of the main housing unit, such that the second portion is sandwiched between the front cover and the back cover of the main housing unit.

4. The portable electronic device as recited in claim 3, further comprising one or more compressible seals arranged between the second portion of the module housing and the one end of the main housing unit to prevent ingress of moisture, dirt and contaminants.

5. The portable electronic device as recited in claim 1, wherein each rail of the pair of L-shaped rails is attached to an inside surface of the module housing via one or more mechanical fasteners, adhesives, heat-staking or ultrasonic welding, snaps, clips, interference fit bosses or by insert molding the rails into the module housing.

6. The portable electronic device as recited in claim 1, wherein the plurality of mechanical fasteners are selected from a group consisting of screws, latches, clips, snaps and interlocking tabs.

7. The portable electronic device as recited in claim 1, wherein a first rail of the pair of L-shaped rails is arranged within the module housing adjacent to a top side of the module housing, and wherein a second rail of the pair of L-shaped rails is arranged within the module housing adjacent to a bottom side of the module housing.

8. The portable electronic device as recited in claim 1, wherein each rail is formed having a vertical portion and a horizontal portion, wherein the vertical portions of the rails are arranged adjacent to top and bottom sides of the module housing, and wherein the horizontal portions of the rails extend orthogonally from the vertical portions in an L-shape.

9. The portable electronic device as recited in claim 1, wherein a portion of each rail near an interface between the main housing unit and the module housing is reinforced to resist bending at the interface.

10. The portable electronic device as recited in claim 1, wherein a length of each rail is configured so that the pair of L-shaped rails extend into the main housing unit by more than 30% of a width of the main housing unit.

11. The portable electronic device as recited in claim 1, further comprising an internal frame structure arranged within the main housing unit of the portable electronic device to which one or more of the internal components of the portable electronic device are coupled, wherein the pair of L-shaped rails are additionally or alternatively attached via the one or more mechanical fasteners to the internal frame structure of the portable electronic device.

12. The portable electronic device as recited in claim 11, wherein depressions formed within the internal frame structure are configured for receiving the pair of L-shaped rails.

* * * * *